(12) United States Patent
Garro et al.

(10) Patent No.: US 11,885,207 B2
(45) Date of Patent: Jan. 30, 2024

(54) FRACTURING FLUID DELIVERY SYSTEMS WITH SACRIFICIAL LINERS OR SLEEVES

(71) Applicant: Cameron International Corporation, Houston, TX (US)

(72) Inventors: Juan Alexander Garro, Baku (AZ); Enrique Villarroel, Fulshear, TX (US); Stuart Robinson, Katy, TX (US); Kirk P. Guidry, Cypress, TX (US); Aleem A. Khokhar, Spring, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

(21) Appl. No.: 17/758,917

(22) PCT Filed: Jan. 12, 2021

(86) PCT No.: PCT/US2021/013100
§ 371 (c)(1),
(2) Date: Jul. 15, 2022

(87) PCT Pub. No.: WO2021/146203
PCT Pub. Date: Jul. 22, 2021

(65) Prior Publication Data
US 2023/0081218 A1    Mar. 16, 2023

Related U.S. Application Data

(60) Provisional application No. 63/080,491, filed on Sep. 18, 2020, provisional application No. 62/962,275, filed on Jan. 17, 2020.

(51) Int. Cl.
*E21B 43/26* (2006.01)
*F16L 11/12* (2006.01)
(Continued)

(52) U.S. Cl.
CPC ......... *E21B 43/2607* (2020.05); *E21B 34/02* (2013.01); *F16L 11/12* (2013.01); *F16L 57/06* (2013.01)

(58) Field of Classification Search
CPC ...... E21B 43/26; E21B 43/2607; F16L 11/12; F16L 57/06
See application file for complete search history.

(56) References Cited

U.S. PATENT DOCUMENTS

| | | | |
|---|---|---|---|
| 5,636,691 A | 6/1997 | Hendrickson et al. | |
| 6,543,811 B1 * | 4/2003 | Campbell | F16L 58/08 285/55 |

(Continued)

FOREIGN PATENT DOCUMENTS

JP    5702659 B2    4/2015

OTHER PUBLICATIONS

International search Report and Written Opinion issued in PCT/US2021/013100, dated May 3, 2021 (13 Pages).

*Primary Examiner* — Matthew R Buck
(74) *Attorney, Agent, or Firm* — Jeffrey D. Frantz

(57) ABSTRACT

Fracturing fluid delivery systems having components with sacrificial liners or sleeves are provided. In one example, a fracturing system includes a flexible fracturing fluid conduit coupled to a wellhead assembly. The flexible fracturing fluid conduit includes a flexible body, a rigid end joined to the flexible body, and a bore extending through the flexible body and the rigid end for conveying fracturing fluid to the wellhead assembly. The flexible fracturing fluid conduit also includes a rigid sacrificial sleeve installed in the rigid end and within the bore. In another example, a fracturing system includes a fracturing fluid delivery apparatus coupled to a wellhead. The fracturing fluid delivery apparatus includes a pressure-containing component having a rigid body with a bore for conveying fracturing fluid. The pressure-containing (Continued)

component has a sacrificial liner provided through the bore along an interior surface of the rigid body. Additional systems, devices, and methods are disclosed.

20 Claims, 12 Drawing Sheets

(51) Int. Cl.
  *F16L 57/06* (2006.01)
  *E21B 34/02* (2006.01)

(56) References Cited

U.S. PATENT DOCUMENTS

| | | | |
|---|---|---|---|
| 6,899,172 B2 | 5/2005 | McLeod et al. | |
| 7,481,239 B2 | 1/2009 | McGuire et al. | |
| 7,934,546 B2 | 5/2011 | McGuire et al. | |
| 8,528,585 B2 | 9/2013 | McGuire | |
| 8,770,277 B2 | 7/2014 | Artherholt | |
| 9,175,556 B2 | 11/2015 | Cherewyk et al. | |
| 9,850,719 B1* | 12/2017 | Ferrier | E21B 17/12 |
| 10,400,538 B2 | 9/2019 | Roesner | |
| 10,480,300 B2 | 11/2019 | Guidry | |
| 11,015,413 B2 | 5/2021 | Guidry | |
| 11,066,913 B2 | 7/2021 | Guidry et al. | |
| 11,319,757 B2 | 5/2022 | Robinson et al. | |
| 2008/0083539 A1 | 4/2008 | Hickie | |
| 2009/0090515 A1 | 4/2009 | Chan et al. | |
| 2009/0145597 A1 | 6/2009 | Cherewyk | |
| 2010/0101676 A1 | 4/2010 | Quigley et al. | |
| 2016/0168970 A1 | 6/2016 | Kajaria et al. | |
| 2016/0208570 A1* | 7/2016 | Ayres | E21B 33/068 |
| 2017/0175905 A1 | 6/2017 | Martino et al. | |
| 2017/0314379 A1* | 11/2017 | Guidry | E21B 43/26 |
| 2019/0040695 A1 | 2/2019 | Sim | |
| 2020/0131889 A1 | 4/2020 | Robinson et al. | |
| 2022/0003093 A1 | 1/2022 | Guidry | |

* cited by examiner

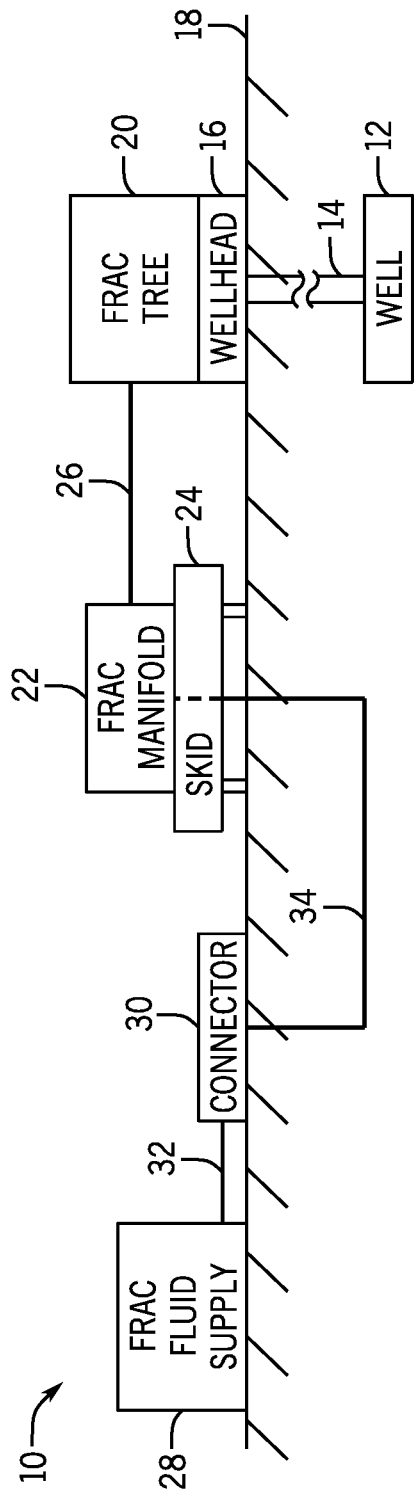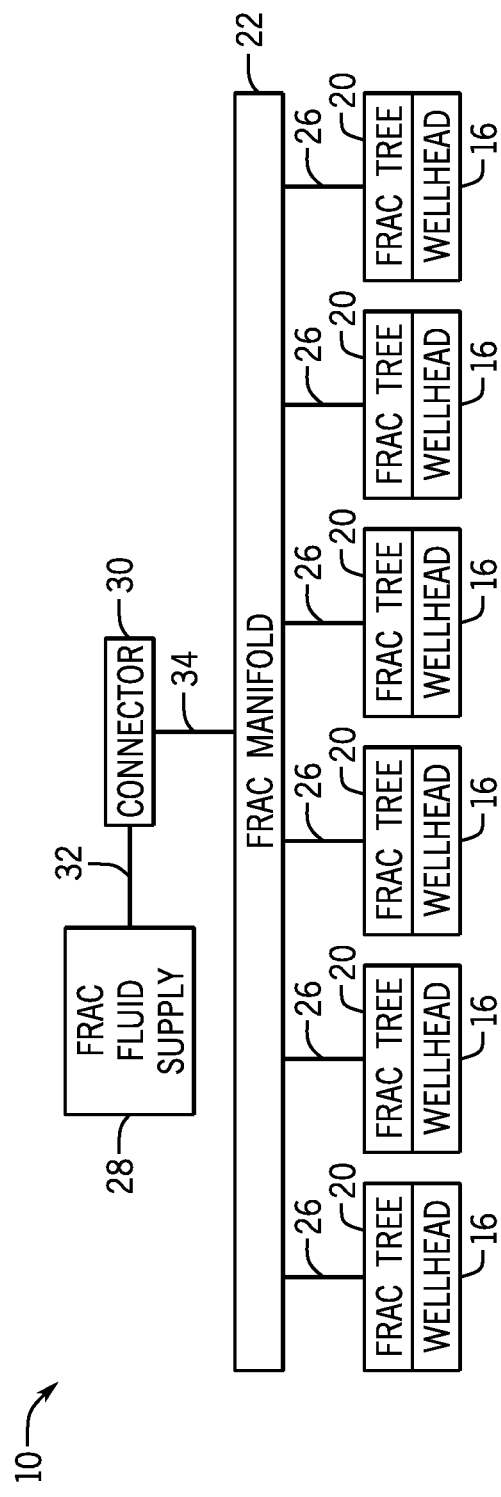

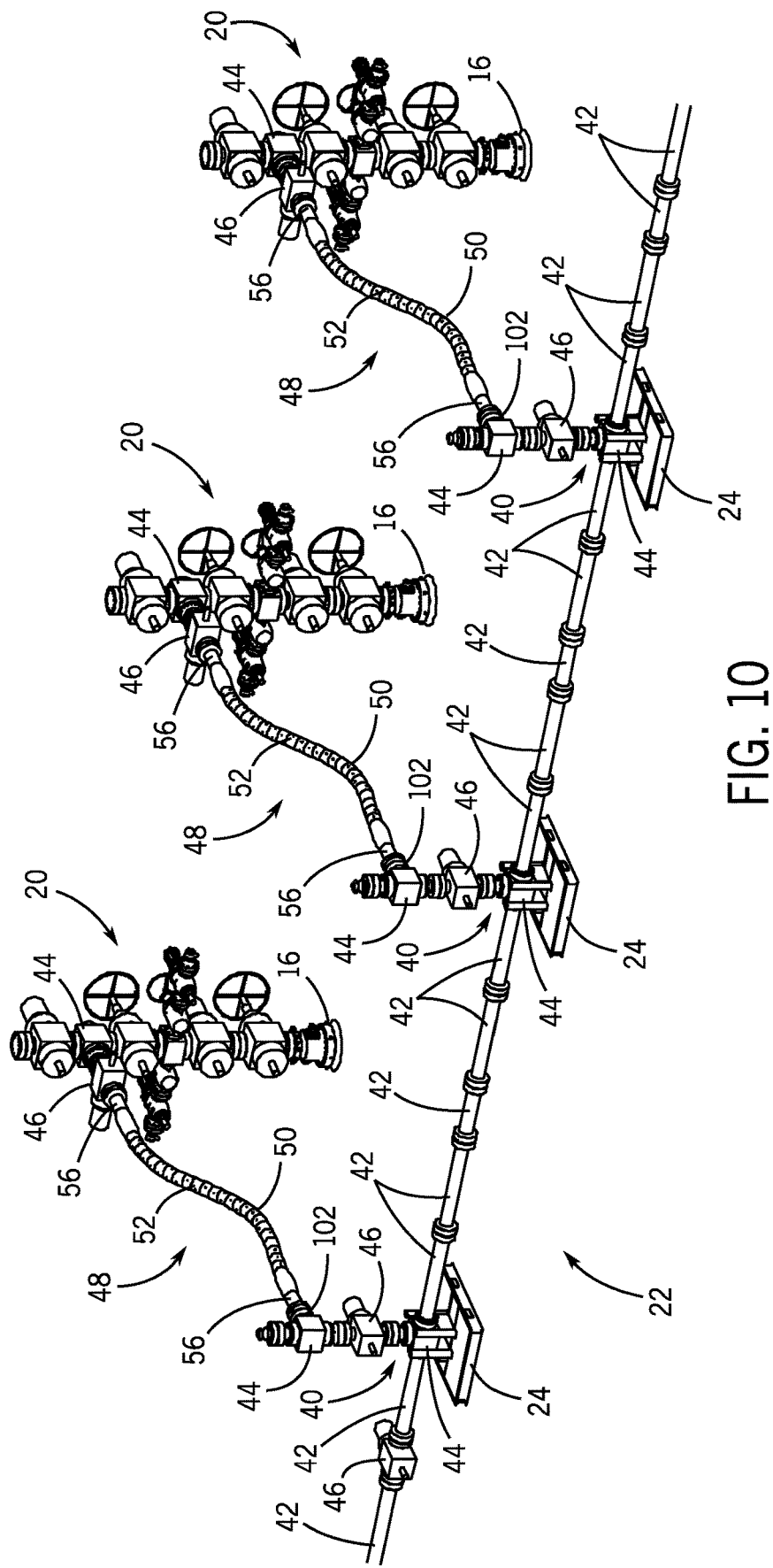

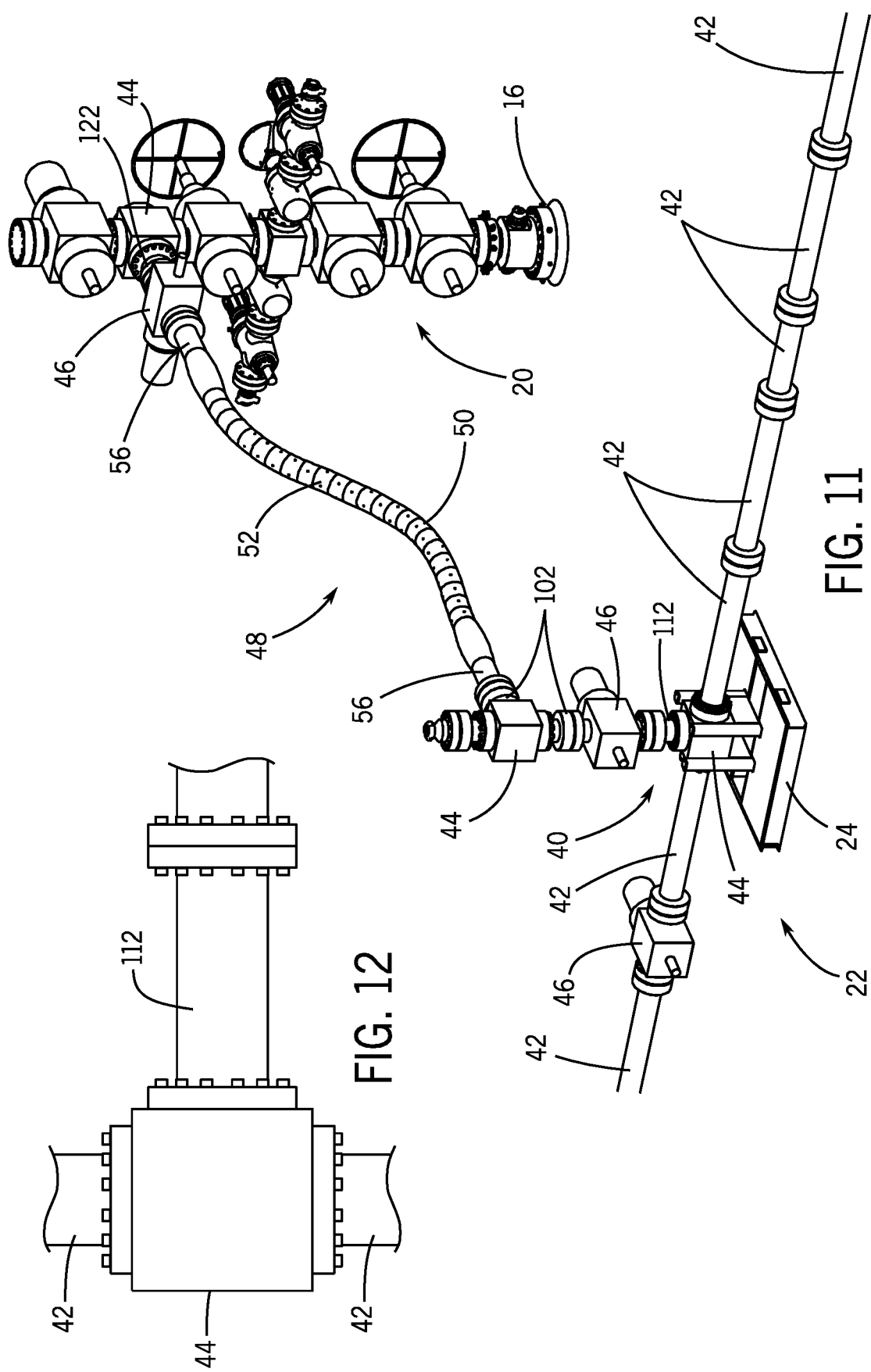

FRACTURING FLUID DELIVERY SYSTEMS WITH SACRIFICIAL LINERS OR SLEEVES

CROSS-REFERENCES TO RELATED APPLICATIONS

This application claims priority to and the benefit of U.S. Provisional Patent Application Ser. No. 62/962,275 filed Jan. 17, 2020, and claims priority to and the benefit of U.S. Provisional Patent Application Ser. No. 63/080,491 filed Sep. 18, 2020, both of which are hereby incorporated by reference in their entireties for all purposes.

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in searching for and extracting oil, natural gas, and other subterranean resources from the earth. Particularly, once a desired subterranean resource is discovered, drilling and production systems are often employed to access and extract the resource. These systems may be located onshore or offshore depending on the location of a desired resource. Further, such systems generally include a wellhead assembly through which the resource is extracted. These wellhead assemblies may include a wide variety of components, such as various casings, valves, fluid conduits, and the like, that control drilling or extraction operations.

Additionally, such wellhead assemblies may use a fracturing tree and other components to facilitate a fracturing process and enhance production from a well. As will be appreciated, resources such as oil and natural gas are generally extracted from fissures or other cavities formed in various subterranean rock formations or strata. To facilitate extraction of such resources, a well may be subjected to a fracturing process that creates one or more man-made fractures in a rock formation. This facilitates, for example, coupling of pre-existing fissures and cavities, allowing oil, gas, or the like to flow into the wellbore. Such fracturing processes typically include injecting a fracturing fluid—which is often a mixture including sand and water—into the well to increase the well's pressure and form the man-made fractures. A fracturing manifold may provide fracturing fluid to one or more fracturing trees via fracturing lines (e.g., pipes).

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Some embodiments of the present disclosure generally relate to fracturing fluid delivery systems. More specifically, some embodiments relate to fracturing systems including flexible fracturing fluid conduits having sacrificial sleeves to reduce erosion of other components of the conduits. In one embodiment, a sacrificial sleeve is received in a rigid end of a flexible fracturing fluid conduit. The sacrificial sleeve can cover and protect at least a portion of a bore wall of the rigid end from erosive flow of fracturing fluid through the flexible fracturing fluid conduit. In some instances, a sacrificial sleeve extends from the rigid end into a flexible body of the flexible fracturing fluid conduit.

Some embodiments also or instead relate to fracturing systems including components having sacrificial liners to mitigate erosion from fracturing fluid conveyed through the components. In certain embodiments, for instance, a pipe, block, or valve has a rigid body with a bore for conveying fracturing fluid, and a sacrificial liner in the bore protects an interior surface of the rigid body from erosive wear. In some instances, the sacrificial liner is a polymeric liner, such as a rubber liner.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein:

FIG. 1 generally depicts a fracturing system in accordance with an embodiment of the present disclosure;

FIG. 2 is a diagram of the fracturing system of FIG. 1 with a fracturing manifold coupled to multiple fracturing trees in accordance with one embodiment;

FIG. 10 is a perspective view of fracturing trees coupled to a fracturing manifold via flexible pipes in accordance with one embodiment;

FIG. 11 is a detail view of a portion of the fracturing manifold and one of the fracturing trees of FIG. 10;

FIG. 12 depicts a connection block joining pipes of a fracturing system in accordance with one embodiment;

DETAILED DESCRIPTION OF SPECIFIC EMBODIMENTS

Figure 3:
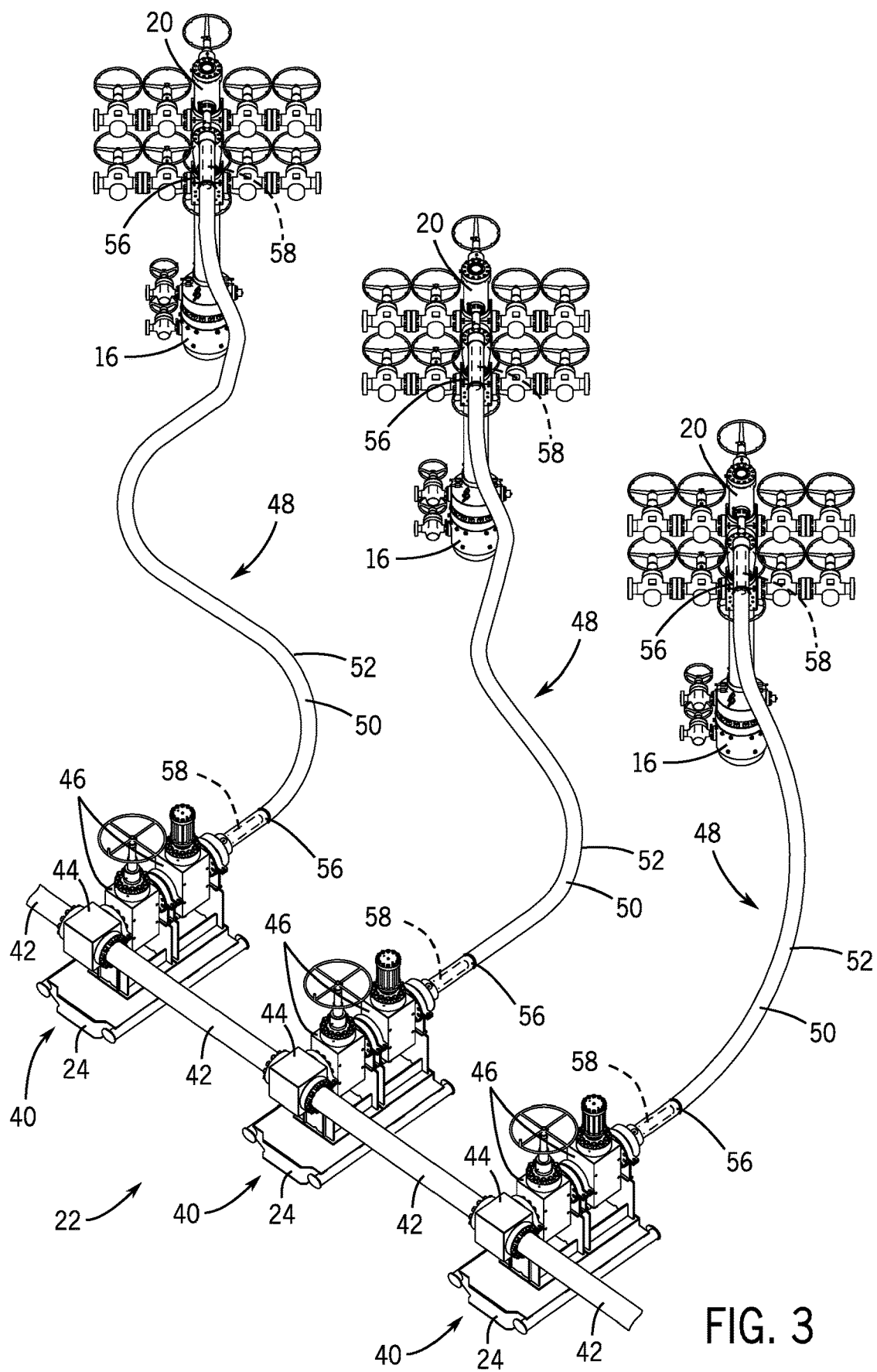
FIG. 3 is a perspective view of certain components of a fracturing system, including a portion of a fracturing manifold mounted on skids and joined to fracturing trees with flexible fracturing fluid conduits having sacrificial sleeves, in accordance with one embodiment.

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Turning now to the present figures, an example of a fracturing system 10 is provided in FIGS. 1 and 2 in accordance with one embodiment. The fracturing system 10 facilitates extraction of natural resources, such as oil or natural gas, from a well 12 via a wellbore 14 and a wellhead 16. Particularly, by injecting a fracturing fluid into the well 12, the fracturing system 10 increases the number or size of fractures in a rock formation or strata to enhance recovery of natural resources present in the formation. In the presently illustrated embodiment, the well 12 is a surface well accessed by equipment of wellhead 16 installed at surface level (i.e., on ground 18). But it will be appreciated that natural resources may be extracted from other wells, such as platform or subsea wells.

The fracturing system 10 includes various components to control flow of a fracturing fluid into the well 12. For instance, the depicted fracturing system 10 includes a fracturing tree 20 and a fracturing manifold 22. In at least some embodiments, the fracturing tree 20 includes at least one valve that controls flow of the fracturing fluid into the wellhead 16 and, subsequently, into the well 12. Similarly, the fracturing manifold 22 may include at least one valve that controls flow of the fracturing fluid to the fracturing tree 20 by a conduit or fluid connection 26, such as one or more pipes.

The fracturing manifold 22 is mounted on at least one skid 24 (e.g., a platform mounted on rails) to facilitate movement of the fracturing manifold 22 with respect to the ground 18. As depicted in FIG. 2, the fracturing manifold 22 is connected to provide fracturing fluid to multiple fracturing trees 20 and wellheads 16. But it is noted that the fracturing manifold 22 may instead be coupled to a single fracturing tree 20 in full accordance with the present techniques. In one embodiment in which the fracturing manifold 22 is coupled to multiple fracturing trees 20, various valves of the fracturing manifold 22 may be mounted on separate skids 24 to enable variation in the spacing between the valves.

Fracturing fluid from a supply 28 is provided to the fracturing manifold 22. In FIG. 1, a connector 30 receives fracturing fluid from the supply 28 through a conduit or fluid connection 32, such as pipes or hoses, and then transmits the fluid to the fracturing manifold 22 by way of a subterranean conduit or fluid connection 34. The fracturing fluid could be routed from the supply 28 to the fracturing manifold 22 entirely above ground without use of a subterranean conduit 34 in other instances. In one embodiment, the fracturing fluid supply 28 is provided by one or more trucks that deliver the fracturing fluid, connect to the connector 30, and pump the fluid into the fracturing manifold 22 via the connector 30 and connections 32 and 34. In another embodiment, the fracturing fluid supply 28 is in the form of a reservoir from which fluid may be pumped into the fracturing manifold 22. But any other suitable sources of fracturing fluid and manners of transmitting such fluid to the fracturing manifold may instead be used.

In at least some embodiments, fracturing fluid is routed to wellhead assemblies through fluid connections 26 having flexible lines. One such example is generally depicted in FIG. 3 as having skid-mounted assemblies 40 of the fracturing manifold 22 coupled to fracturing trees 20 by fluid conduits 48. The assemblies 40 include connection blocks 44 connected via pipes 42. The pipes 42 and the connection blocks 44 are part of a trunk line of the manifold 22 for routing fracturing fluid to be delivered to multiple wellhead assemblies and it will be appreciated that other portions of the trunk line (e.g., other skid-mounted assemblies 40 for providing fracturing fluid to additional wellhead assemblies) can be coupled to those depicted in FIG. 3.

Valves 46 enable individual control of the flow of fracturing fluid from the trunk line to each fracturing tree 20 through the fluid conduits 48. The valves 46 are depicted here as mounted on the skids 24 as parts of the assemblies 40 of the fracturing manifold 22. In other instances, valves 46 could also or instead be positioned elsewhere (e.g., at the other end of the fluid conduits 48) or omitted (in which case valves of the fracturing trees could be used to control flow of fracturing fluid from the manifold into the wells).

The fluid conduits 48 are each depicted in FIG. 3 as flexible fracturing fluid conduits including a flexible pipe 50 (which may also be referred to as a flexible hose) coupled to route fracturing fluid from the manifold 22 to a fracturing tree 20 of a wellhead assembly. As depicted, the flexible pipe 50 includes a flexible body 52, which may be formed of a polymeric material (e.g., natural or synthetic rubber), a composite material (which may include a polymer), or some other suitable material. In at least some instances, the flexible body 52 is formed with polyetheretherketone (PEEK) or another polymer in the polyaryletherketone (PAEK) family. The inclusion of polymeric or composite materials in the flexible body 52 may reduce the weight of the conduit 48, as compared to a conduit formed entirely of iron or steel. Further, the flexibility provided by such materials allows the conduit 48 to be bent to allow an operator to more easily install the conduit 48 (such as between the fracturing manifold 22 and a fracturing tree 20) by allowing the profile of the conduit 48 to be changed to accommodate differences in spacing, elevation, and angular alignment between connection points for the ends of the conduit 48. In certain embodiments, the flexible pipe 50 has a reinforced flexible body 52, such as a wire-belted body. In some embodiments, such as that depicted in FIG. 3, a fluid pathway is provided from the manifold 22 to a given well through a single fluid conduit 48, such that all fracturing fluid pumped into the given well during a fracturing operation passes through that fluid conduit 48. But in other instances, multiple fluid conduits 48 (e.g., flexible pipes 50) may be connected in parallel to route fracturing fluid along multiple paths from a manifold 22 to a given well. And while the fluid conduits 48 are depicted as flexible conduits in FIG. 3, the fluid conduits 48 could be provided as rigid conduits (e.g., rigid pipes without flexible bodies 52) in other embodiments.

Fracturing fluid typically contains sand or other abrasive particulates that can erode conduits through which the fracturing fluid flows. In at least some embodiments, the flexible pipe 50 can include an inner liner within the body 52 to reduce erosive effects from flow of fracturing fluid or other abrasive fluids through the bore of the pipe 50. Such an inner liner may be, for example, a layer of rubber, a layer of some other polymeric or composite material, a wire mesh liner, or a corrugated sleeve liner. During fluid flow through the pipe 50 (e.g., during a fracturing operation), a liner can reduce impingement of abrasive particulates on the inner surface of the body 52 and, consequently, reduce erosive wear of the body 52. Although the pipe 50 may include a liner in some instances, it will be appreciated that the pipe 50 could be used without a liner in other embodiments.

In at least some embodiments, the fluid conduits 48 can also or instead include sacrificial sleeves installed in the bores of the conduits 48. In FIG. 3, for example, the flexible pipes 50 are shown as having rigid ends 56 (e.g., mandrels) joined to the flexible bodies 52, with sacrificial sleeves 58 installed in bores of the rigid ends 56. The rigid ends 56 can be attached to or formed on the flexible bodies 52 in any suitable manner. The sacrificial sleeves 58 extend through the bores along at least portions of the interiors of the rigid ends 56 (i.e., along bore walls within the rigid ends 56) to reduce erosive wear of the rigid ends 56 during flow operations (e.g., during fracturing through the conduits 48). In some instances, the sacrificial sleeves 58 installed within the rigid ends 56 can also extend into the flexible bodies 52 to reduce erosive wear of portions of the flexible bodies 52, as well as interfaces between the flexible bodies 52 and the rigid ends 56 along the bores of the conduits 48, covered by the sleeves 58.

The fluid conduits 48 can be connected between the fracturing manifold 22 and wellhead assemblies in various manners. The rigid ends 56 of the fluid conduits 48 depicted in FIG. 3, for instance, are fastened (e.g., via studs and nuts) to the fracturing trees 20 and the fracturing manifold 22 through flanges (e.g., American Petroleum Institute (API) flanges) on the rigid ends 56. In other embodiments, various quick connectors can also or instead be used to connect the fluid conduits 48 to the fracturing trees 20 and the fracturing manifold 22. While a single fluid conduit 48 is shown in FIG. 3 connecting each wellhead assembly (e.g., the fracturing tree 20 and wellhead) to the fracturing manifold 22, in other instances multiple fluid conduits 48 could be connected in parallel to each wellhead assembly to provide fluid through multiple lines to each well. The fluid conduits 48 may be connected to other fracturing equipment (instead of or in addition to fracturing trees or manifolds) in other instances. Flexible fluid conduits 48 can be used in the trunk line of the manifold 22 or between an instrumentation skid, missile trailer, or the manifold, for instance. Although the fluid conduits 48 may be used to convey fracturing fluids, the fluid conduits 48 may also or instead be used to convey other fluids.

The rigid ends 56 of the fluid conduits 48 can be formed with any suitable material, such as steel or another metal. In at least some embodiments, the sacrificial sleeves 58 are also rigid bodies and may also be formed with steel, another metal, or any other suitable material. By way of further example, a sacrificial sleeve 58 is shown installed in an end of a fluid conduit 48 in FIG. 4. More specifically, the depicted sacrificial sleeve 58 is positioned in a rigid end 56 of the fluid conduit 48 so as to extend along and protect the inner bore wall of the rigid end 56 at the entrance to the fluid conduit 48. The sacrificial sleeve 58 is shown as a rigid body in FIG. 4, though the sacrificial sleeve 58 can be provided as a flexible body in other instances.

The rigid end 56 is generally shown as having a connection flange 62 and a hollow body 64 enclosing an end of a bore 68 of the fluid conduit 48. The flange 62 facilitates attachment of the fluid conduit 48 to other equipment (e.g., to the fracturing manifold 22, a fracturing tree 20, or another conduit), such as with fasteners installed through mounting holes in the flange 62. Further, the flange 62 can be attached to a separate body 64 (e.g., by threading the flange 62 on the body 64 or welding the flange 62 to the body 64) or be formed integrally with the body 64 (e.g., through forging or casting). In still other embodiments, the flange 62 may be omitted and the rigid end of the fluid conduit 48 could be coupled to other equipment in some other manner. A seal groove 66 may be provided in an end face of the rigid end 56 to allow installation of a gasket or other seal between the fluid conduit 48 and connected equipment.

Figure 4:
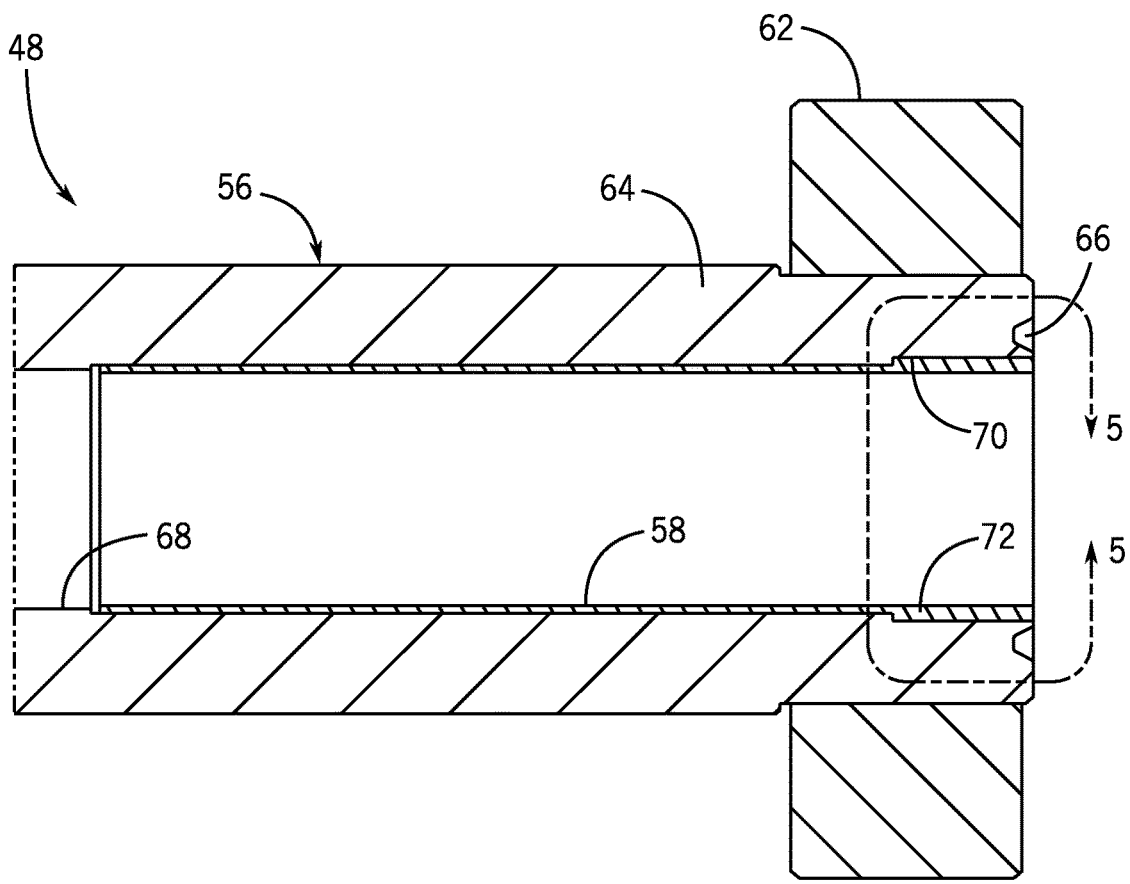
FIG. 4 is a section view of one end of a fluid conduit having a sacrificial sleeve installed in a rigid end of the fluid conduit in accordance with one embodiment.

As depicted in FIG. 4, the sacrificial sleeve 58 is positioned within the bore 68 of the fluid conduit 48. This sleeve 58 extends along and covers at least a portion of the bore wall within the rigid end 56. As fluid is conveyed through the bore 68 (e.g., fracturing fluid routed to a wellhead assembly), the sacrificial sleeve 58 shields the covered portion of the bore wall from erosion by the fluid passing through the bore 68. One or more seals can be provided between the sacrificial sleeve 58 and the rigid end 56 in some instances to inhibit ingress of fluid into an interstitial space between the outer surface of the sleeve 58 and the bore wall of the rigid end 56 covered by the sleeve 58, but such seals may be omitted in other instances.

Figure 5:
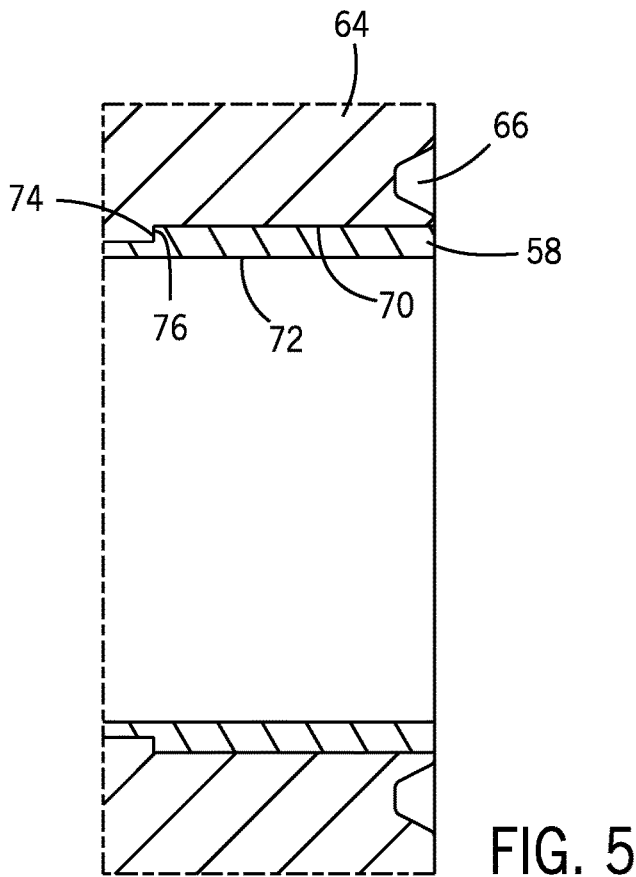
FIG. 5 is a detail view of a portion of the sacrificial sleeve and rigid end depicted in FIG. 4 in accordance with one embodiment.

The sacrificial sleeve 58 can be retained in the fluid conduit 48 in any suitable manner. In some embodiments, the sacrificial sleeve 58 is held in the bore 68 without forging (e.g., cold forging), adhering, or fastening the sleeve 58 to the fluid conduit 48. One such example is depicted in FIGS. 4 and 5, in which the rigid end 56 includes a socket 70 for receiving an enlarged diameter portion (e.g., a head 72) of the installed sacrificial sleeve 58. As shown in FIG. 5, the head 72 includes a retention shoulder 74 and the rigid end 56 includes a retention shoulder 76. These mating retention shoulders 74 and 76 can cooperate to restrict axial movement of the sacrificial sleeve 58 through the bore 68, with the shoulder 76 serving as a no-go shoulder to stop travel of the head 72 further into the bore. As shown in FIGS. 4 and 5, the sleeve 58 is contained within the bore 68 and does not protrude outwardly from the fluid conduit 48. In other instances, however, the sleeve 58 retained in the conduit 48 may protrude outwardly from the bore 68 (e.g., past the end face having the seal groove 66 in FIGS. 4 and 5). Other equipment to which the rigid end 56 is connected (e.g., a fracturing tree 20 or the manifold 22) can inhibit axial movement of the head 72 out of the conduit 48, such as through abutment with the end of the head 72 opposite the shoulder 74. In another embodiment, a retaining ring may be installed at the end of the conduit 48 (e.g., within the bore 68) to retain the sleeve 58 within the bore 68. The sacrificial sleeve 58 can also or instead be retained in the bore 68 in any other suitable manner, such as via forging, adhesion, crimping, or fasteners. The head 72 may be omitted from the sleeve 58 in some embodiments, such as in those cases in which the head 72 is not used for retention.

Figure 6:
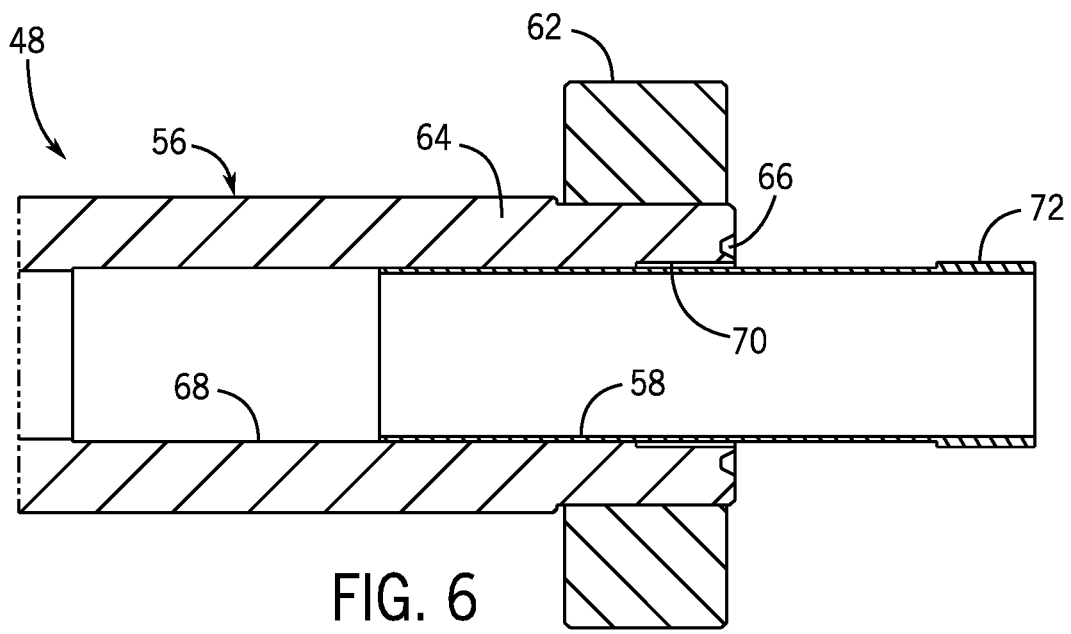
FIG. 6 is a section view of the end of the fluid conduit of FIG. 4 and generally shows the sacrificial sleeve being inserted or removed from the rigid end in accordance with one embodiment.
Figure 7:
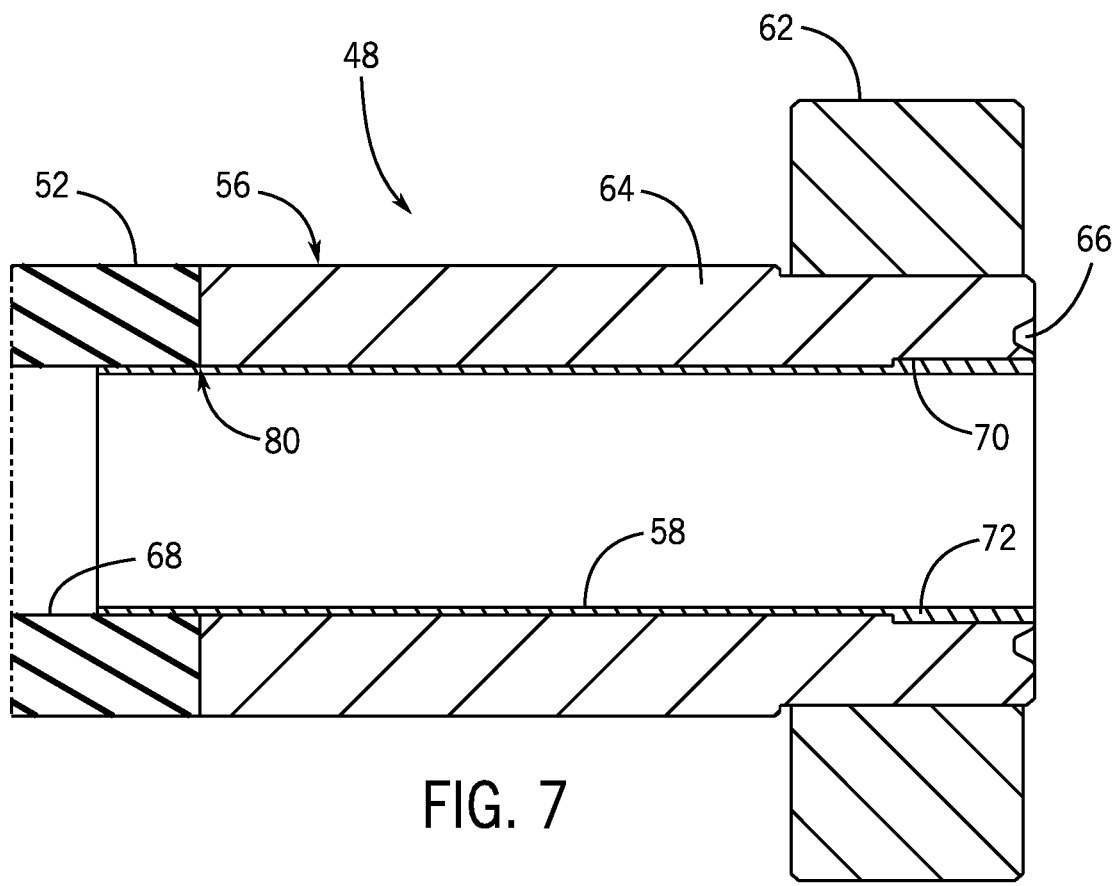
FIG. 7 is a section view of one end of a fluid conduit having a sacrificial sleeve installed in a rigid end of the fluid conduit and extending into a flexible body of the fluid conduit in accordance with one embodiment.

The sacrificial sleeve 58 can be installed in the fluid conduit 48 by inserting the sleeve 58 into the bore 68, such as generally shown in FIG. 6. More particularly, the sleeve 58 depicted in FIGS. 4-6 can be inserted into and then positioned within the bore 68 so as to be located at an entrance (or exit) of the flexible fracturing fluid conduit (e.g., in the rigid end 56), such as shown in FIGS. 4 and 5 (or as shown in FIG. 7, described below). With the sacrificial sleeve 58 installed, the end of the fluid conduit 48 (e.g., a flexible fracturing fluid conduit 48) can be coupled in fluid communication with fracturing equipment, such as the fracturing tree 20 or manifold 22. During a fracturing operation, fracturing fluid may be routed through the fluid conduit 48 and the sleeve 58 inhibits erosion of the fluid conduit 48 within the bore 68 at the end of the conduit 48. Abrasive flow of fluid through the sleeve 58 may gradually erode the sleeve 58. After fracturing, the fluid conduit 48 can be uncoupled from the fracturing equipment and the sacrificial sleeve 58 (e.g., a sleeve 58 determined after inspection to be worn) can be pulled or otherwise removed from the bore 68, and a replacement sacrificial sleeve 58 can be installed in the end of the fluid conduit 48 in place of the removed sacrificial sleeve 58. And in some instances, the sacrificial sleeve 58 is configured so as to be field-replaceable (i.e., the sleeve 58 is not forged or adhered within the bore and can be removed in the field without machining or cutting the sleeve 58 out of the fluid conduit 48).

In at least some embodiments, sleeves 58 can be installed and removed from the bore 68 through axial motion, without requiring rotation of the sleeves 58 in the bore 68. In other instances, rotation may be used to facilitate installation of the sleeves 58 in the bores 68. In some embodiments, for example, the sleeve 58 may have a threaded portion (e.g., on or in place of the head 72) that engages a mating threaded portion of the bore 68, and the sleeve 58 may be rotated to thread the sleeve 58 into the bore 68.

While the sacrificial sleeve 58 may be contained entirely within the rigid end 56 in some embodiments, the sleeve 58 may protrude from the rigid end 56 in other embodiments. As noted above, the sleeve 58 may protrude from the bore 68 out the end of the fluid conduit 48 in some cases. But the sleeve 58 may also or instead protrude further into the bore 68 from the rigid end 56. As shown in FIG. 7, for example, the sleeve 58 can extend from within the rigid end 56 into the flexible body 52 of a flexible fracturing fluid conduit 48. In this manner, the sleeve 58 extends along the bore 68 and covers an interface 80 between the rigid end 56 and the flexible body 52.

In at least some embodiments, the length of the portion of the sleeve 58 positioned along the flexible body 52 in the bore 68 is less than the length of the portion of the bore 68 extending through the rigid end 56 and allows the fluid conduit 48 to flex at a location along the flexible body 52 at which the sleeve 58 is not present. In some instances, the length of the portion of the sleeve 58 positioned along the flexible body 52 in the bore 68 is less than the length of the portion of the sleeve 58 positioned along the rigid end 56 in the bore 68. Also, in some embodiments the fluid conduit 48 is more than fifteen feet long and each sacrificial sleeve 58 is positioned entirely within the first (or last) five feet of the fluid conduit 48. Further, a portion of the sleeve 58 extending into the flexible body 52 can be crimped (e.g., radially outwardly) to engage the flexible body 52 and help retain the sleeve 58 in its position within the bore 68.

Although FIGS. 4-7 depict one end of a fluid conduit 48 having a sacrificial sleeve 58, it will be appreciated that the other end of the fluid conduit 48 may also or instead have a sacrificial sleeve 58, such as described above. For example, each flexible fracturing fluid conduit 48 in FIG. 3 is depicted as having sacrificial sleeves 58 at its opposite ends. In other instances, however, a sacrificial sleeve 58 may be provided in just a single end of the fluid conduit 48.

Figure 8:
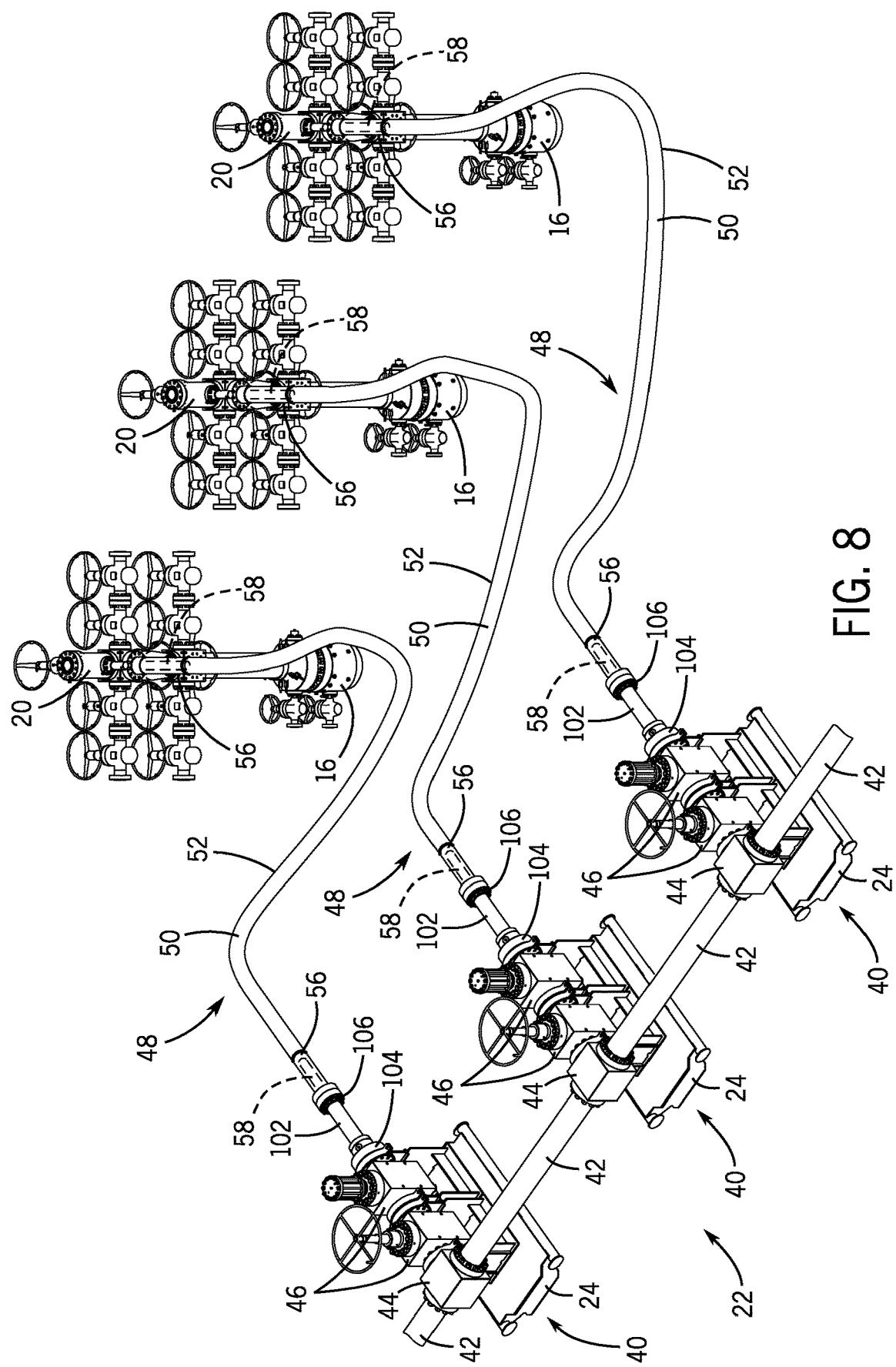
FIG. 8 is a perspective view of certain components of a fracturing system having spacer pipes installed between valves and flexible pipes in accordance with one embodiment.
Figure 9:
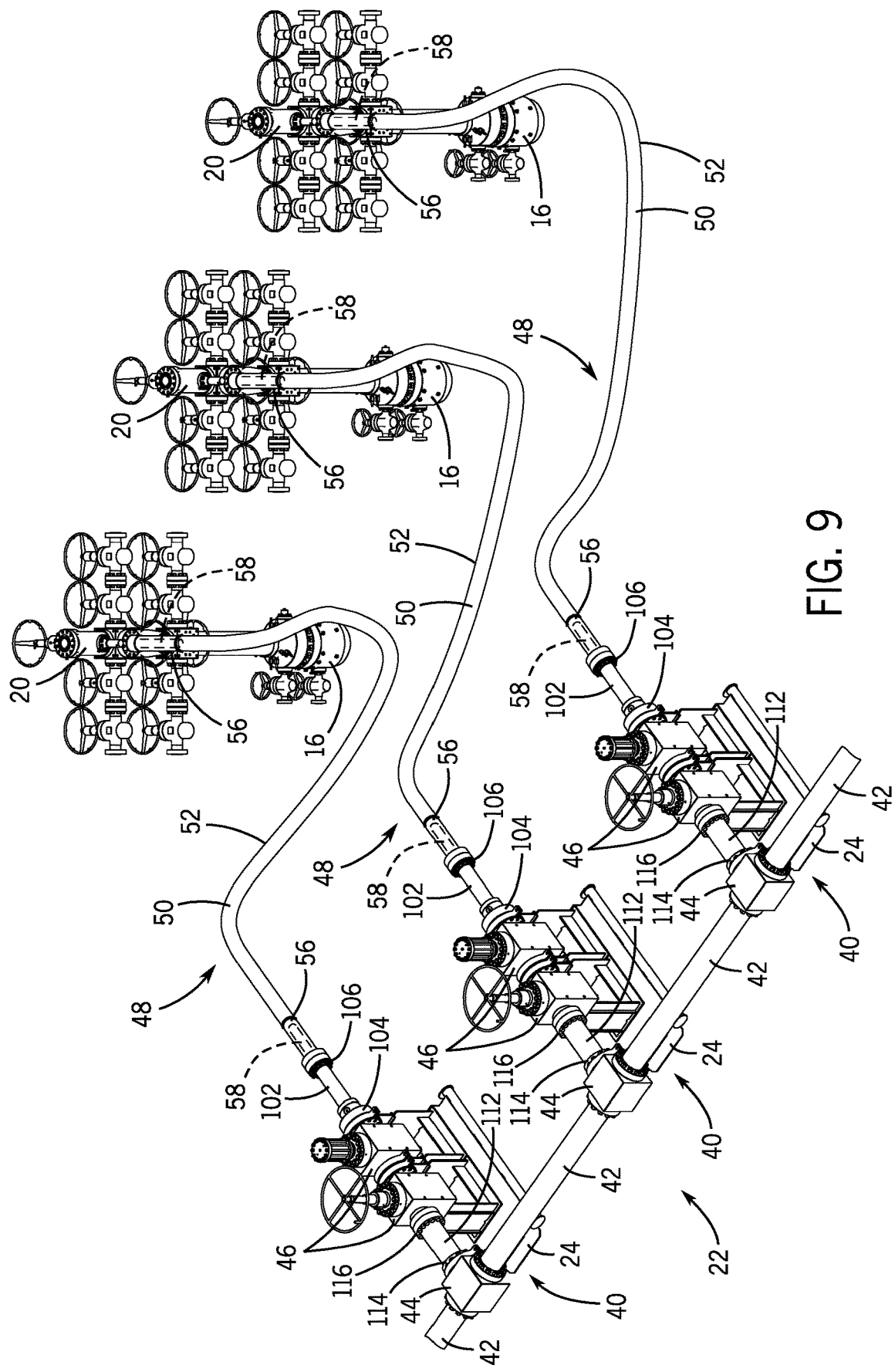
FIG. 9 is a perspective view of certain components of a fracturing system like those of FIG. 8 but having spacer pipes installed between a manifold trunk line and valves in accordance with one embodiment.

Fracturing systems may include other erosion-mitigation features in addition to, or instead of, sacrificial sleeves. One example of this is generally depicted in FIG. 8, which shows a fracturing system like that of FIG. 3 (i.e., having a fracturing fluid delivery apparatus with wellhead assemblies connected to a fracturing manifold trunk line via flexible pipes) but with a spacer pipe 102 installed upstream of each flexible pipe 50. The spacer pipes 102 may take any suitable form but are shown in FIG. 8 as spools with flanges 104 connected to outlet flanges of valves 46 on the skid-mounted assemblies 40 and flanges 106 connected to flanges (e.g., flanges 62) of the flexible pipes 50. A fracturing system may also or instead include spacer pipes installed between other components. As shown in FIG. 9, for instance, spacer pipes 112 may be installed between the trunk line of the manifold 22 and the valves 46 of the skid-mounted assemblies 40. The spacer pipes 112 may also be provided as spools with flanges 114 connected to connection blocks 44 (e.g., tees) of the trunk line of the manifold 22 and flanges 116 connected to valves 46 (e.g., via complementary flanges of the valves 46, as shown in FIG. 9) of the skid-mounted assemblies 40.

Another embodiment of a fracturing system is shown in FIG. 10 in accordance with one embodiment. In this depicted system, the skid-mounted assemblies 40 of the manifold 22 include upright outlet branch portions that extend upwardly from the trunk line of the manifold 22. These upright outlet branch portions may include one or more valves 46 to control flow of fracturing fluid toward a particular well, but valves 46 may also or instead be provided elsewhere in the system. For instance, as shown in greater detail in FIG. 11, a first valve 46 may be provided upstream of a flexible pipe 50 (e.g., in the upright outlet branch) and a second valve 46 may be provided downstream from the flexible pipe 50 (e.g., between a rigid end 56 of the flexible pipe 50 and the fracturing tree 20) to control flow of fracturing fluid from the trunk line of the manifold 22 to a well through the flexible pipe 50.

In addition to the valves 46 and the flexible pipes 50, other pressure-containing components of the fracturing system may include various connection blocks 44 and rigid pipes, such as spacer pipes 102 and 112 shown upstream of the flexible pipe 50 in FIG. 11. An additional pipe 122 may be used to connect the second valve 46 to a connection block 44 (e.g., flow cross) of the fracturing tree 20. In some embodiments, the second valve 46 has a different bore diameter than the connection block 44 of the fracturing tree 20, and the additional pipe 122 is an adapter spool that connects these two components in fluid communication.

It will be appreciated that fracturing systems can include a variety of fracturing equipment (e.g., pressure-containing components) for routing fracturing fluid to wells, such as rigid pipes, flexible pipes, valves, frac heads, flow crosses, tees, and elbows. These pressure-containing components, which may also be referred to as fluid-delivery components, can be connected to form various portions of a fracturing fluid delivery apparatus, such as the fracturing tree 20, the fracturing manifold 22, and fluid lines therebetween. Flow crosses, tees, and elbows may be provided in the form of connection blocks in some instances (e.g., as shown in FIG. 12 with a tee in the manifold 22 provided as a connection block 44 joining pipes 42 and 112) but may take any other suitable form (e.g., tubular fittings). The various pipes and other pressure-containing components assembled to provide fracturing fluid to a wellhead assembly may be collectively referred to as a pipe assembly, examples of which are shown in FIGS. 3 and 8-11.

In some embodiments of the present technique, a fracturing fluid delivery apparatus includes at least one pressure-containing component (e.g., of a pipe assembly or of a wellhead assembly) including a rigid body, with a bore for conveying fracturing fluid, and a sacrificial liner provided through the bore along an interior surface of the rigid body to protect the interior surface from erosive wear from fracturing fluid conveyed through the bore. The sacrificial liner may take any suitable form but is provided as a polymeric liner in some embodiments. For instance, bores of pipes, flow crosses, tees, elbows, valves, frac heads, or other components may be lined with a layer of natural or synthetic rubber to protect underlying internal surfaces of these components. The rubber liner may be more resistant to erosive wear than the underlying internal surface, and the rubber may be vulcanized in some instances to improve wear characteristics of the liner. While the polymeric liner may be an elastomeric liner (e.g., a resilient, vulcanized-rubber liner) in some embodiments, the polymeric liner may not be resilient (e.g., a rubber liner vulcanized to a hard rubber state) in other embodiments. In some instances, sacrificial liners may be formed with one or more thermoplastics or thermosets. The sacrificial liner could be formed with a liquid rubber, an epoxy, or some other resin. The liquid rubber, epoxy, or other resin may also include reinforcing fibers or particles (e.g., glass, carbon black, carbon fibers, or aramid fibers) to improve wear characteristics of the sacrificial liner. The liquid rubber, epoxy, or other resin may be self-curing or may be cured through the addition of a curing agent. Heat, pressure, visible light, or ultraviolet light may be applied to facilitate curing in some instances. In additional embodiments, a polymeric liner may be formed by applying a monomer (e.g., a liquid monomer resin) to a surface and then polymerizing the applied monomer.

Figure 13:
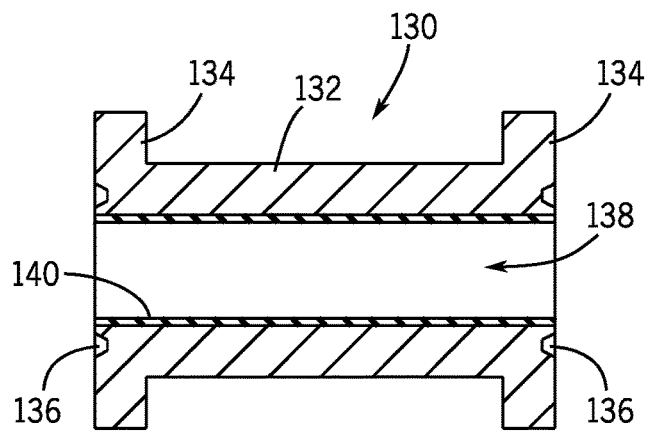
FIG. 13 depicts a rigid pipe that includes a sacrificial liner and may be used in a fracturing system in accordance with one embodiment.

Some examples of rigid pressure-containing components having sacrificial liners, such as the liners described above, are depicted in FIGS. 13-19. For instance, a lined pipe 130 is depicted in FIG. 13 as a spool having a body 132 and flanges 134 (e.g., API flanges) to facilitate connection of the pipe 130 to other equipment (e.g., via studded connections). In other instances, one or both flanges 134 may be omitted from the pipe 130. The pipe 130 may include seal grooves 136 for receiving seal gaskets and containing pressure within a bore 138 when the pipe 130 when connected to other equipment. A sacrificial liner 140 (e.g., a rubber or other polymeric liner) extends through the bore 138 along the bore wall of the body 132 and protects the bore wall from erosive wear caused by fracturing fluid conveyed through the bore 138.

Figure 14:
FIGS. 14-16 depict connection blocks that include sacrificial liners and may be used in a fracturing system in accordance with some embodiments.
Figure 15:
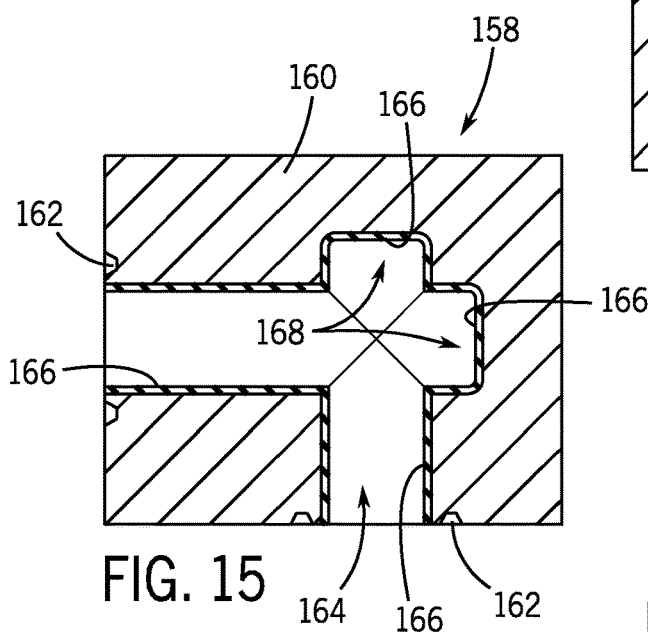
Figure 16:
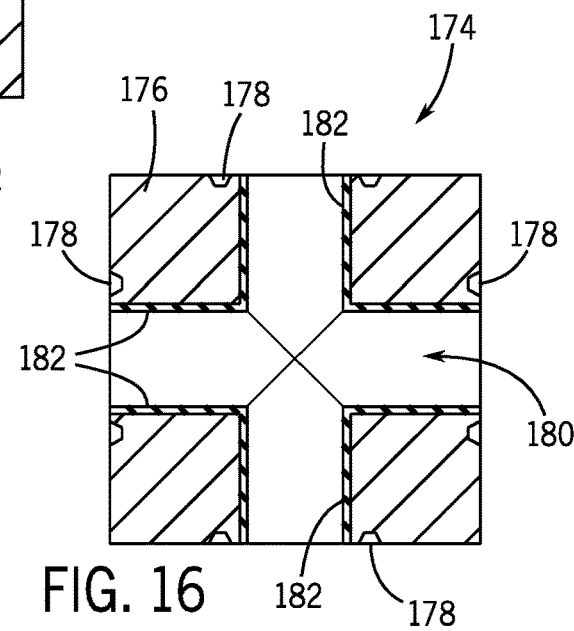

FIGS. 14-16 depict examples of lined connection blocks that may be used to join pipes or other components in fracturing systems. As depicted in FIG. 14, a flow tee 144 includes a body 146 with seal grooves 148 and a bore 150. The tee 144 also includes a sacrificial liner 152 provided through the bore 150 along interior surfaces of the body 146. Similarly, FIG. 15 depicts an elbow 158 including a body 160 having seal grooves 162 and a bore 164, with a sacrificial liner 166 provided through the bore 164 to protect interior surfaces of the body 160. The bore 164 may include internal flow pockets 168 that reduce flow velocity through the body 160 and reduce erosive wear in some instances. Still further, FIG. 16 depicts a flow cross 174 having a body 176, seal grooves 178, and a bore 180 with a sacrificial liner 182 to protect interior surfaces of the body 176. The lined connection blocks can have any suitable shapes, which may include cubic, cuboid, or non-cuboid shapes in various implementations.

Figure 17:
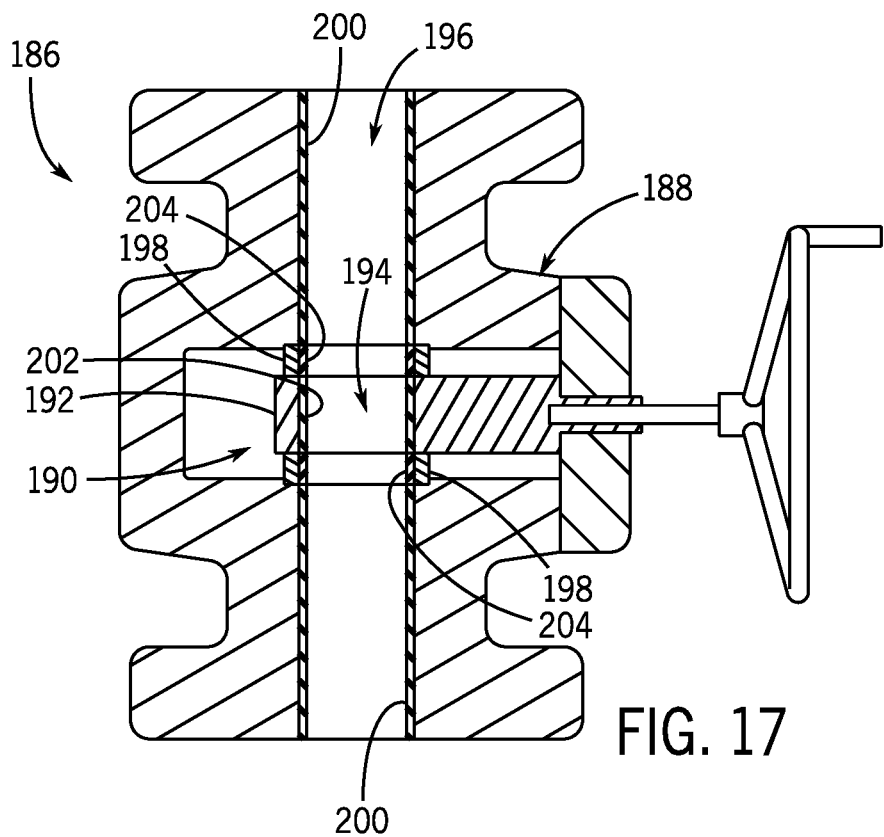
FIG. 17 depicts a valve that includes a sacrificial liner and may be used in a fracturing system in accordance with one embodiment.
Figure 18:
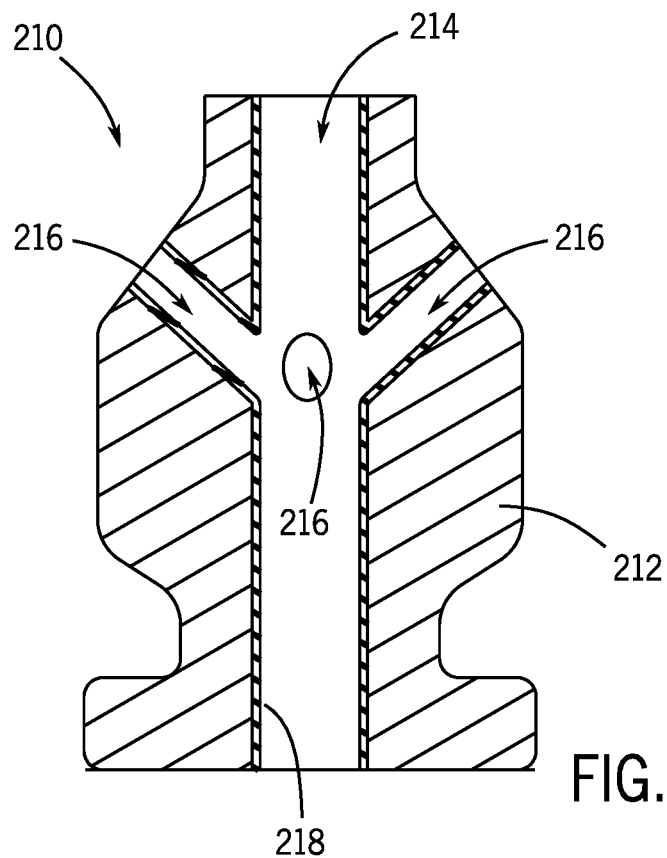
FIG. 18 depicts a frac head that includes a sacrificial liner and may be used in a fracturing system in accordance with one embodiment.

Valves, frac heads, and other pressure-containing components of a fracturing system may also be lined. A lined valve 186 is depicted in FIG. 17 by way of example. Although depicted here as a gate valve, the lined valve 186 may be provided as some other type of valve, such as a ball valve or a check valve, in other embodiments. The presently depicted valve 186 includes a body 188 having a cavity 190. A gate 192 with an aperture 194 moves within the cavity 190 to selectively control flow through a bore 196. In some instances, the valve 186 includes seats 198 (e.g., seat rings) that seal between the body 188 and the gate 192. As shown in FIG. 17, the valve 186 may have a sacrificial liner 200 on the bore wall of the body 188. The valve 186 may also or instead have one or more other sacrificial liners, such as a sacrificial liner 202 in the aperture 194 of the gate 192 or sacrificial liners 204 on the inner surfaces of the seats 198. An example of a frac head (which may also be referred to as a goat head) having a liner is depicted in FIG. 18. In this example, the frac head 210 has a body 212 with a central bore 214 and fluid ports 216. A sacrificial liner 218 protects internal surfaces of the body 212 along the central bore 214 and the fluid ports 216. Further, while the rigid bodies of lined pressure-containing components (e.g., bodies 132, 146, 160, 176, 188, and 212 of FIG. 13-18) can be formed of any suitable material, these are metallic bodies (e.g., steel bodies) in at least some embodiments. The bodies may include mounting holes to facilitate connection to other components (e.g., via API studded connections).

Figure 19:
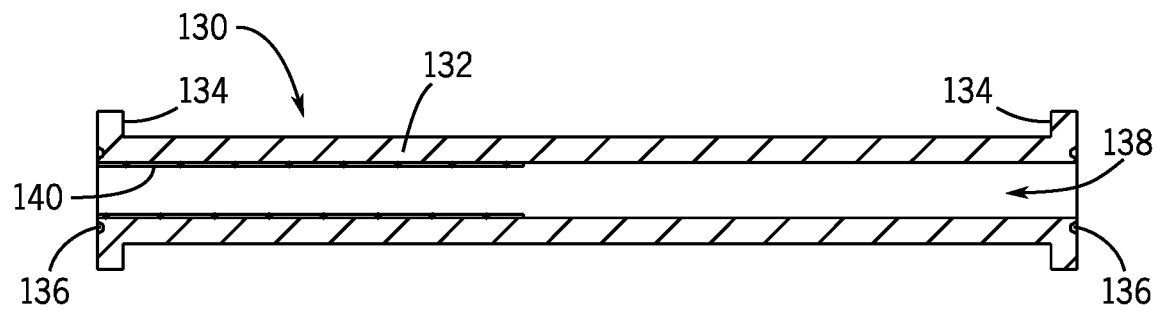
FIG. 19 depicts a rigid pipe that includes a partially lined bore and may be used in a fracturing system in accordance with one embodiment.

Although some pressure-containing components may be fully lined (e.g., those depicted in FIGS. 13-18), in other instances pressure-containing components may be partially lined. As shown in FIG. 19, for example, the bore 138 of the pipe 130 is only partially lined with the sacrificial liner 140 (e.g., a polymeric liner). In some embodiments, the length of the sacrificial liner 140 within the bore 138 is at least four times the diameter of the bore 138. The length of the sacrificial liner 140 may also or instead be no more than half the length of the bore 138. In the embodiment depicted in FIG. 19, for instance, the sacrificial liner 140 has a length between four times the diameter of the bore 138 and half the length of the bore 138.

Figure 20:
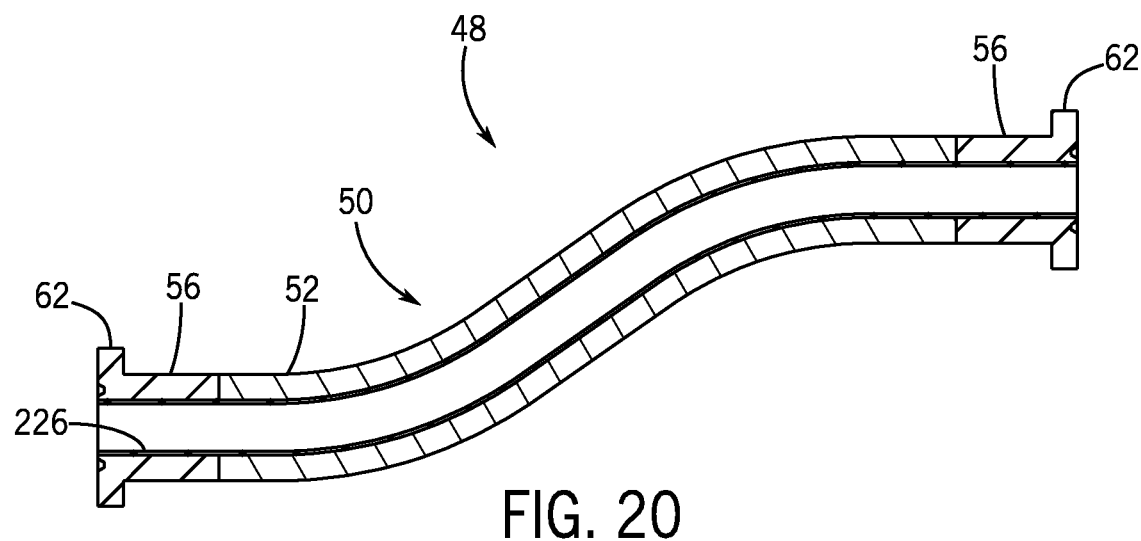
FIG. 20 depicts a flexible pipe that includes a sacrificial liner and may be used in a fracturing system in accordance with one embodiment.

While rigid components with sacrificial liners are depicted in FIGS. 13-19 by way of example, such sacrificial liners may also be applied to flexible components. For instance, a flexible pipe 50 having a sacrificial liner 226 (e.g., a polymeric liner) within its bore is depicted in FIG. 20. In this embodiment, the sacrificial liner 226 extends the length of the bore of the flexible pipe 50 through the rigid ends 56 and the flexible body 52. In other instances, the bore of the flexible pipe 50 may be only partially lined with the sacrificial liner 226. It will be appreciated that the lined components depicted in FIGS. 13-20 may be used in fracturing systems, such as those shown in FIGS. 1-3 and 8-12 (e.g., as blocks 44, valves 46, or pipes 42, 50, 102, 112, or 122).

Figure 21:
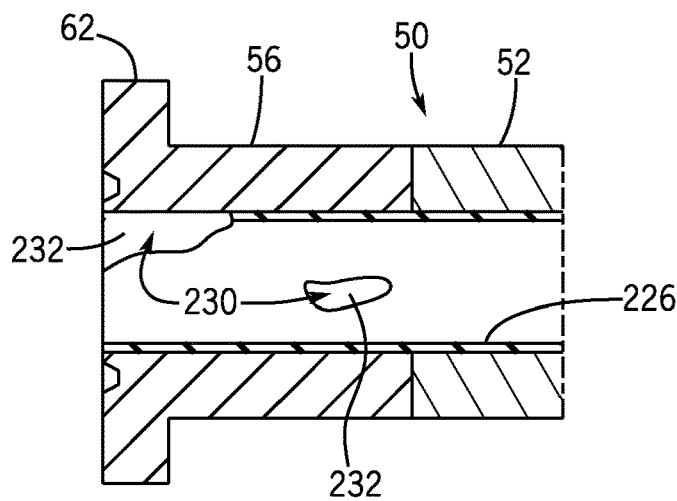
FIGS. 21 and 22 depict worn portions of a lined pressure-containing component in accordance with one embodiment.
Figure 22:
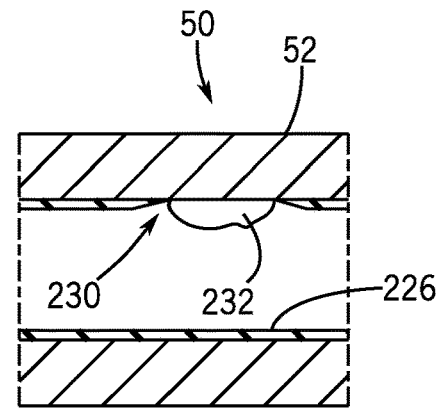

The internal sacrificial liners described above may wear over time. Among other things, fracturing fluid routed through lined pipes or other lined components may erode the sacrificial liners. Examples of such wear in a flexible pipe 50 are generally represented in FIGS. 21 and 22 as worn portions 230 in the sacrificial liner 226. These worn portions 230 can be in the liner 226 along a rigid end 56 of a flexible pipe 50 (as shown in FIG. 21), along the flexible body 52 of the pipe 50 (as shown in FIG. 22), or along both a rigid end 56 and the flexible body 52 (i.e., across an interface between the rigid end 56 and the flexible body 52). The wear may form holes in the liner 226 and expose underlying surfaces (e.g., exposed surfaces 232 of the rigid end 56 and flexible body 52 in FIGS. 21 and 22). In other instances, a hole at the worn portion 230 may extend into but not through the liner 226 (i.e., with the underlying surface still covered by a remaining portion of the liner 226 at the worn portion) or may extend fully through the liner 226 and also into the underlying surface (e.g., wear of the rigid end 56 or flexible body 52 itself at the exposed surface 232). Although a flexible pipe 50 with worn portions 230 is depicted in FIGS. 21 and 22, it will be appreciated that other pressure-containing components described above (e.g., rigid pipes, connection blocks, valves, and frac heads) may also have such worn portions.

Figure 23:
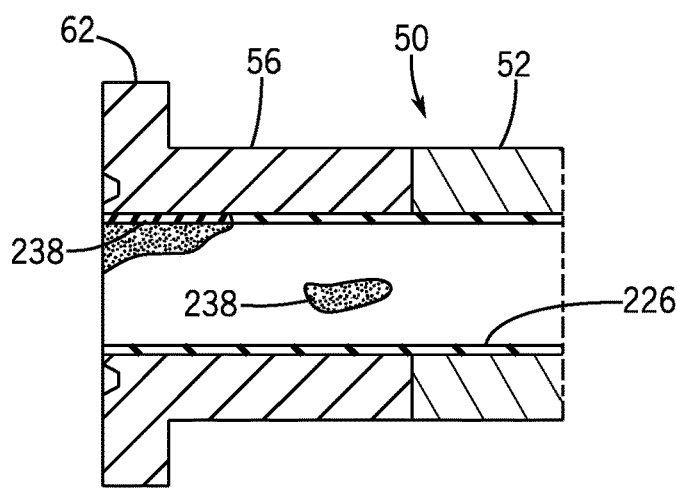
FIGS. 23 and 24 depict the lined pressure-containing component of FIGS. 21 and 22 with replacement portions filling holes at the worn portions in accordance with one embodiment.
Figure 24:
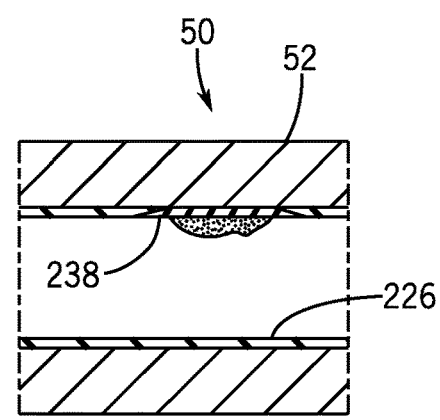

A pressure-containing component with worn portions 230 may be refurbished in any suitable manner. In some embodiments, a worn sacrificial liner (e.g., liner 140, 152, 166, 182, 200, 202, 204, 218, or 226) may be removed from the component (e.g., a pipe, valve, elbow, tee, flow cross, valve, or frac head) and replaced with a new sacrificial liner. In other instances, worn portions within a component may be repaired, such as by filling or otherwise patching the worn portions. Examples of this are generally shown in FIGS. 23 and 24, with replacement portions 238 (which may also be referred to as patches) filling holes at the worn portions 230. In one such embodiment, a pressure-containing component may be refurbished by identifying a worn portion of an interior surface within a bore of the component (e.g., a worn portion of a sacrificial liner in the bore or of an unlined bore wall), applying a liquid (e.g., liquid rubber or an epoxy) to the worn portion, and then curing the liquid to form a solid polymeric surface over the worn portion of the interior surface. It is noted, however, that such a technique is not limited to patching holes in worn components and may also or instead be used more generally to apply a protective coating to an interior surface of a pressure-containing component (whether used or new). For example, a liquid (e.g., liquid rubber or an epoxy) may be applied to an interior surface within a bore of the component and cured to form a solid polymeric surface that protects at least a portion of the interior surface from erosive wear from fracturing fluid conveyed through the bore (e.g., during a fracturing operation in which fracturing fluid is routed to a wellhead assembly through the bore). In some instances, applying the liquid includes coating the interior surface with the liquid from one end of the bore to an opposite end of the bore and curing the liquid to form a protective coating that extends the length of the bore.

The conduits 48 and the fracturing fluid delivery systems described above can be constructed for various operating pressures and with different bore sizes depending on the intended application. In some embodiments, the fluid conduits 48 are constructed for rated maximum operating pressures of 10-15 ksi (approximately 69-103 MPa). Further, the conduits 48 of some embodiments have bores between four and eight inches (approx. 10 and 20 cm) in diameter, such as bores having a five- or five-and-one-eighth-inch (approx. 13 cm) diameter or a seven-inch (approx. 18 cm) diameter. Other components in the fracturing systems (e.g., the various blocks, pipes, and valves described above) may also have such bore diameters and pressure capabilities.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A fracturing system comprising:
a wellhead assembly; and
a flexible fracturing fluid conduit coupled to the wellhead assembly to enable receipt of fracturing fluid by the wellhead assembly from the flexible fracturing fluid conduit, the flexible fracturing fluid conduit including:
a flexible body;
a rigid end joined to the flexible body, the rigid end including a socket and an annular retention shoulder, wherein the annular retention shoulder has an inner diameter that is less than an inner diameter of the socket; and
a rigid sacrificial sleeve installed in the socket so as to extend along and protect at least a portion of a bore wall of the rigid end from erosive flow of the fracturing fluid through the flexible fracturing fluid conduit during a fracturing operation, wherein the rigid sacrificial sleeve includes a head with a retention shoulder engaged with the annular retention shoulder.

2. The fracturing system of claim 1, wherein the rigid sacrificial sleeve is contained within a bore of the flexible fracturing fluid conduit and does not protrude out of the flexible fracturing fluid conduit.

3. The fracturing system of claim 1, wherein the rigid sacrificial sleeve extends from the rigid end into the flexible body so as to cover an interface between the rigid end and the flexible body.

4. The fracturing system of claim 1, wherein the rigid end includes a connection flange to facilitate attachment of the flexible fracturing fluid conduit to other equipment.

5. The fracturing system of claim 1, wherein the wellhead assembly includes a fracturing tree.

6. The fracturing system of claim 5, wherein the flexible fracturing fluid conduit is connected to route the fracturing fluid to the fracturing tree.

7. The fracturing system of claim 1, comprising a fracturing manifold coupled to the wellhead assembly via the flexible fracturing fluid conduit.

8. The fracturing system of claim 7, wherein the flexible fracturing fluid conduit is coupled to the fracturing manifold so as to route the fracturing fluid from the fracturing manifold into the flexible fracturing fluid conduit through the rigid end and the rigid sacrificial sleeve.

9. The fracturing system of claim 1, wherein the flexible fracturing fluid conduit includes an additional rigid end joined to the flexible body such that a bore of the flexible fracturing fluid conduit extends through the rigid end, the flexible body, and the additional rigid end, and wherein the rigid end and the additional rigid end are opposite ends of the flexible fracturing fluid conduit.

10. The fracturing system of claim 9, wherein the rigid end or the additional rigid end is attached to the wellhead assembly.

11. The fracturing system of claim 9, comprising an additional rigid sacrificial sleeve installed in the additional rigid end and within the bore so as to extend along and protect at least a portion of a bore wall of the additional rigid end from erosive flow of the fracturing fluid through the flexible fracturing fluid conduit during the fracturing operation.

12. A flexible fracturing fluid conduit comprising:
a flexible body;
a first rigid end coupled to a first end of the flexible body and a second rigid end coupled to a second end of the flexible body such that the first rigid end and the second rigid end are at opposite ends of the flexible fracturing fluid conduit, wherein the first rigid end includes a socket and an annular retention shoulder, wherein the annular retention shoulder has an inner diameter that is less than an inner diameter of the socket;
a bore of the flexible fracturing fluid conduit extending through the first rigid end, the flexible body, and the second rigid end; and
a sacrificial sleeve installed within the socket of the first rigid end of the flexible fracturing fluid conduit, wherein the sacrificial sleeve includes a head with a retention shoulder engaged with the annular retention shoulder.

13. The flexible fracturing fluid conduit of claim 12, comprising an additional sacrificial sleeve installed within the bore in the second rigid end of the flexible fracturing fluid conduit.

14. The flexible fracturing fluid conduit of claim 12, wherein the sacrificial sleeve extends through the bore from the first rigid end and into the flexible body.

15. The flexible fracturing fluid conduit of claim 12, wherein the sacrificial sleeve includes a rigid sacrificial sleeve and is not forged into, adhered, or fastened to the first rigid end or the flexible body.

16. The flexible fracturing fluid conduit of claim 12, wherein the sacrificial sleeve is contained within the bore of the flexible fracturing fluid conduit and does not protrude out of the flexible fracturing fluid conduit.

17. A method comprising:
inserting a rigid sacrificial sleeve into a socket of a rigid end of a flexible fracturing fluid conduit; and
positioning the rigid sacrificial sleeve within the socket to engage a first retention shoulder of a head of the rigid sacrificial sleeve with a second retention shoulder located at an end of the socket; and
coupling the flexible fracturing fluid conduit to fracturing equipment; and
routing fracturing fluid through the flexible fracturing fluid conduit, wherein the rigid sacrificial sleeve inhibits erosion, by the fracturing fluid, of the flexible fracturing fluid.

18. The method of claim 17, comprising:
uncoupling the flexible fracturing fluid conduit from the fracturing equipment;
removing the rigid sacrificial sleeve from the socket of the flexible fracturing fluid conduit; and
installing a replacement rigid sacrificial sleeve in the socket of the flexible fracturing fluid conduit to engage a retention shoulder of a head of the replacement rigid sacrificial sleeve with the second retention shoulder.

19. The method of claim 17, comprising:
uncoupling the flexible fracturing fluid conduit from the fracturing equipment;
removing the rigid sacrificial sleeve from the socket of the flexible fracturing fluid conduit;
repairing the rigid sacrificial sleeve; and
reinserting the rigid sacrificial sleeve into the socket.

20. The method of claim 17, wherein the fracturing equipment is a fracturing tree.

* * * * *